United States Patent [19]

Sato et al.

[11] 4,450,871

[45] May 29, 1984

[54] HEAT-SHRINKABLE TUBES

[75] Inventors: Yasutoshi Sato; Keiji Ueno, both of Osaka, Japan

[73] Assignee: Sumitomo Electric Industries, Ltd., Osaka, Japan

[21] Appl. No.: 370,635

[22] Filed: Apr. 21, 1982

[30] Foreign Application Priority Data

Apr. 21, 1981 [JP] Japan ............................ 56-57488[U]

[51] Int. Cl.³ .......................... F16L 9/14; F16L 11/00
[52] U.S. Cl. .................................. 138/140; 138/137; 138/145; 174/DIG. 8; 428/36
[58] Field of Search ................. 174/DIG. 8; 138/137, 138/140, 145; 428/36

[56] References Cited

U.S. PATENT DOCUMENTS

| | | | |
|---|---|---|---|
| 3,086,242 | 4/1963 | Cook et al. | 264/230 |
| 3,382,121 | 5/1968 | Sherlock | 174/DIG. 8 |
| 3,415,287 | 12/1968 | Heslop et al. | 174/DIG. 8 |
| 3,576,387 | 4/1971 | Derby | 174/DIG. 8 |
| 3,597,372 | 8/1971 | Cook | 525/104 |
| 4,223,177 | 9/1980 | Nakamura | 174/DIG. 8 |
| 4,336,087 | 6/1982 | Martuch | 264/230 |

OTHER PUBLICATIONS

Chemplast, "KORVEX ® Heat Shrinkable Tubing" by Chemplast Inc., Wayne, N.J., 1977 (B6), 12 pages.

*Primary Examiner*—William R. Dixon, Jr.
*Attorney, Agent, or Firm*—Sughrue, Mion, Zinn, Macpeak and Seas

[57] ABSTRACT

A heat-shrinkable tube is described, which is provided with a compound layer on the inner surface. The compound layer contains a polymerous compound containing an unsaturated bond, and a peroxide. This heat-shrinkable tube is suitable particularly for insulative covering of electronic parts or areas where they are fitted in electronic devices.

6 Claims, 1 Drawing Figure

HEAT-SHRINKABLE TUBES

BACKGROUND OF THE INVENTION

The present invention relates to heat-shrinkable tubes, and more particularly, to heat-shrinkable tubes for use in insulative covering of electronic parts which are used in electronic devices or areas where the electronic parts are fitted.

In recent years electronic parts have been increasingly used in calculators, picture or sound equipment, and other various controlling devides. These electronic parts, e.g., integrated circuits (ICs) and transistors, and areas where they are fitted are usually covered with appropriate insulative coating for the purposes of insulation, prevention of moisture, and protection. This insulative coating has heretofore been carried out by, e.g., a method in which a resin is introduced into a mold which has been provided around a part to be covered and, thereafter, is solidified, a method in which dip coating is applied using a resin solution which is then solidified, or a method in which a tape is wound. These methods, however, have disadvantages in that much labor and time are needed, and the quality varies depending on the skill of the operator.

A method of applying an insulative covering using a heat-shrinkable tube has recently been proposed to avoid the defects of the conventional methods. This method has a very simplified application compared with conventional methods. When applying a heat-shrinkable tube onto a part to be covered with the tube, a compound layer which will function as an adhesive or filler is provided. The compound layer is positioned between the heat-shrinkable tube and the part in order to increase the effect of adhesion and prevent moisture leakages. In general industrial applications, there has herertofore been used a method in which a part to be covered is inserted through a heat-shrinkable tube with a compound layer provided on the inner surface thereof. Thereafter, heat-shrinkage is applied to fill the clearance between the tube and the part with the compound.

It has been revealed, however, that the conventional heat-shrinkable tubes can not be used for insulative coating of electronic parts or areas where they are fitted as intended with the invention. The most well known compound layer to be provided on the inner surface of the heat-shrinkable tube is a hot-melt type compound layer. These hot-melt type compound layers, however, are not reliable in that the cover of the compound is sometimes shifted by the heat generated by, e.g., soldering, during assembling of electronic parts. This results because the hot-melt type compound melts upon the application of increased temperature. In addition, there has been proposed a method in which in place of the above hot-melt type compound, a one-pack type thermosetting compound comprising an epoxy resin and a latent type hardener is used to form a compound layer on the inner surface of the heat-shrinkable tube. This method is also not suitable because the amine compounds used as latent type hardeners may cause corrosion of equipment or a reduction in the characteristics thereof because they have corrosive properties.

SUMMARY OF THE INVENTION

An object of the invention is to provide a heat-shrinkable tube which is suitable particularly for insulative covering of electronic parts or areas where they are fitted.

As a result of extensive research it has been found that the above object can be achieved by providing on the inner surface of the tube a coating layer containing polymerous compound containing an unsaturated bond and a peroxidase.

Therefore, the present invention provides a heat-shrinkable tube comprising a base layer of heat-shrinkable, polymeric material in the form of a tube having an inner surface and an outer surface and a coating layer on the inner surface of the tube, the coating layer comprised of polymeric compound containing an unsaturated bond and a peroxide.

DETAILED DESCRIPTION OF THE INVENTION

Figure 1:
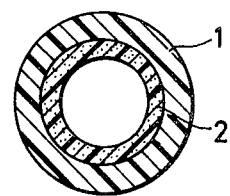
FIG. 1 is a cross-sectional view of a heat-shrinkable tube of the invention.

Heat-shrinkable tubes per se are prepared by molding polymeric materials in a tubular form, expanding the tube mechanically, and by maintaining the tubular form in the expanded form as described in U.S. Pat. No. 3,086,242. Various polymers can be used for producing heat-shrinkable tubes, as described in U.S. Pat. No. 3,597,372, e.g., polyolefins, fluorine-based polymers, and rubbers. The tubes are capable of recovering their original form when heated. Of the above described polymeric materials, fluorine-based polymers such as polyvinylidene flouride and an ethylene tetrafluoride-propylene hexafluoride copolymer are superior from a standpoint of heat resistance.

The compound layer to be provided on the inner surface of the heat-shrinkable tube contains a polymeric compound containing an unsaturated bond, and a peroxide. Such polymeric compounds contain an unsaturated bond so that they are capable of being activated by peroxides and of undergoing a polymerization reaction to yield polymeric compounds having greater molecular weights. Furthermore, they are semisolid or solid at ordinary temperature (about 0 to 30° C.), and soften or liquefy at temperatures at which the heat-shrinkable tube is subjected to heat-shrinkage (about 120 to 400° C.). An example of such polymeric compounds is an acryl- or methacryl-modified epoxy resin.

For example, bisphenol type epoxy resin diacrylate ("Ripoxy Resin" trade name for a product of Showa Highpolymer Co., Ltd.) having the following formula

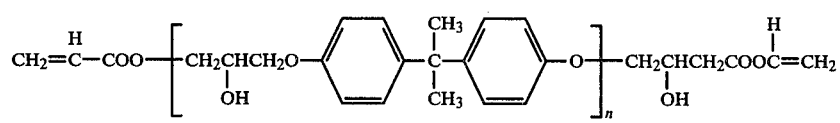

can be used in the present invention wherein "n" is an integer representing a degree of polymerization.

Peroxides which can be used include tert-butyl perbenzoate and dicumyl peroxide, having relatively high decomposition temperatures (e.g., about 120° C. or more).

The polymeric compound containing an unsaturated bond and the peroxide are mixed at a temperature below the decomposition temperature of the peroxide, and provided on the inner surface of the heat-shrinkable tube. In addition to the polymeric compound and the peroxide, and if necessary, a viscosity-controlling material (e.g., silicon dioxide powder), a polymerization inhibitor (e.g., hydroquinone), and a pigment so forth may be added to the compound.

The compound layer can be provided on the inner surface of the heat-shrinkable tube by any appropriate technique, e.g., a method in which the compound is dissolved in a solvent and coated, a method in which the compound is melted by heating up to a temperature below the decomposition temperature of the peroxide, and a method in which the compound is previously molded to form a tube over which is then fitted the heat-shrinkable tube as described in U.S. Pat. Nos. 3,382,121 and 3,415,287.

The compound layer permits easy introduction of a part to be covered into the heat-shrinkable tube since it is composed of the polymeric compound which is semisolid or solid at ordinary temperature (about 0 to 30° C.). The clearance between the part and the heat-shrinkable tube can be sufficiently filled with the polymeric compound containing an unsaturated bond since the polymeric compound softens or liquidizes when heated to a temperature at which the heat-shrinkable tube is heat-shrunk (about 120 to 400° C.). Furthermore, the polymeric compound can undergo polymerization and hardening simultaneously with the heat-shrinkage of the heat-shrinkable tube.

The following example is given to illustrate the invention in greater detail.

EXAMPLE 1

A heat-shrinkable tube of the invention was prepared, comprising a heat-shrinkable tube 1 and a compound layer 2. The layer 2 formed on the inner surface of the heat-shrinkable tube 1 as illustrated in the Figure. The heat-shrinkable tube 1 was made of polyvinylidene fluoride, and had an inner diameter of 1.0 mm and an outer diameter of 2.0 mm. A compound having the composition as defined hereafter was dissolved in methyl ethyl ketone as a solvent and coated on the inner surface of the heat-shrinkable tube 1 in a thickness of 0.1 mm. The solvent was evaporated to provide the compound layer 2, which resulted in the formation of the heat-shrinkable tube having the compound layer of the invention.

| Composition of Compound | |
|---|---|
| Ripoxy Resin VR-90 (trade name for acryl-modified epoxy resin having a viscosity of about 200 poise at 100° C. and being solid at room temperature (m.p. 43 to 48° C.), produced by Showa Highpolymer Co., Ltd., Japan) | 100 parts by weight |
| Dicumyl peroxide | 2 parts by weight |

Through the thus-formed heat-shrinkable tube of the invention was inserted a copper lead wire having a diameter of 0.5 mm. The combination was then heated at 180° C. for 30 minutes. The heat-shrinkable tube having a compound layer of the invention shrunk while covering the lead wire. Simultaneously with the shrinkage of the tube, the compound layer filled the clearance between the heat-shrinkable tube 1 and the lead wire, and solidified therein.

The lead wire covered with the heat-shrinkable tube of the present invention was heated to 150° C. and drawn with a force of 1 kg but the lead wire was not taken out from within the heat-shrinkable tube.

EXAMPLE 2

A heat-shrinkable tube having a compound layer was prepared in the same manner as in EXAMPLE 1 except that the compound used in EXAMPLE 1 was replaced by a compound having the following composition.

| | |
|---|---|
| Ripoxy Resin VR-90 (trade name for acryl-modified epoxy resin having a viscosity of about 200 poise at 100° C. and being solid at room temperature (m.p. 43 to 48° C.), produced by Showa Highpolymer Co., Ltd., Japan) | 50 parts by weight |
| Ripoxy Resin VR-80 (trade name for acryl-modified epoxy resin having a viscosity of about 10 poise at 100° C. and being a viscous liquid at room temperature, produced by Showa Highpolymer Co., Ltd., Japan) | 50 parts by weight |
| Dicumyl peroxide | 2 parts by weight |

The compound was flexible to some extent at room temperature so that the resultant heat-shrinkable tube had a certain flexibility.

Test was conducted in the same manner as in EXAMPLE 1 to evaluate the characteristics of the heat-shrinkable tube. As a result the lead wire was not withdrawn from the heat-shrinkable tube.

EXAMPLE 3

A heat-shrinkable tube having a compound layer was prepared in the same manner as in EXAMPLE 1 except that the compound used in EXAMPLE 1 was replaced by a compound having the following composition.

| | |
|---|---|
| Tris(2-hydroxyethyl)isocyanuric acid trimethacrylate | 70 parts by weight |
| Ripoxy Resin VR80 (trade name for acryl-modified epoxy resin having a viscosity of about 10 poises at 100° C. and being a viscous liquid at room temperature, produced by Showa Highpolymer Co., Ltd., Japan) | 30 parts by weight |
| Dicymyl peroxide | 2 parts by weight |

This heat-shrinkable tube was tested in the same manner as in EXAMPLE 1 to evaluate the characteristics thereof and as a result it was shown that the lead wire was not withdrawn from within the heat-shrinkable tube.

EXAMPLE 4

A heat-shrinkable tube having a compound layer was prepared in the same manner as in EXAMPLE 1 except that the heat-shrinkable tube per se was made of a tetrafluoroethylene-hexafluoropropylene copolymer. This heat-shrinkable tube was tested in the same manner as in EXAMPLE 1 to evaluate characteristics thereof. As a result it was shown that the lead wire was not withdrawn from within the tube.

EXAMPLE 5

A heat-shrinkable tube 1 having an inner diameter of 2.2 mm and an outer diameter of 3.0 mm was prepared with polyvinylidene fluoride. Then, a tube for an inner compound layer having an inner diameter of 1.2 mm and an outer diameter of 2.0 mm was prepared with the composition as used in EXAMPLE 2 using an extruder. This tube for inner compound layer was cut to form a piece of 30 mm in length and was inserted into a piece of the heat-shrinkable tube having the same length as the piece of inner compound layer tube to obtain a heat-shrinkable tube having a compound layer. A copper wire having a diameter of 1.0 mm was inserted into the heat-shrinkable tube which then was heated at 180° C. for 30 minutes. As a result, in the same manner as observed in EXAMPLE 1, the heat-shrinkable tube shrank to cover the copper wire while the inner compound layer filled the space between the heat-shrinkable tube and the copper wire simultaneously with shrinkage and was cured.

The copper wire of the above assembly when heated to 150° C. was drawn with a force of 1 kg. However, it was not drawn out from within the heat-shrinkable tube having a compound layer.

The heat-shrinkable tube of the invention has high reliability from a thermal standpoint. The tube can be easily applied to an insulative covering of electronic parts or areas where they are fitted without any danger of causing corrosion of electronic parts or devices and of reducing the characteristics thereof.

While the invention has been described in detail and with reference to specific embodiment thereof, it will be apparent to one skilled in the art that various changes and modifications can be made therein without departing from the spirit and scope thereof.

What is claimed is:

1. A heat-shrinkable tube comprising
a base layer of heat-shrinkable polymeric material in the form of a tube having an inner surface and an outer surface and
a layer of a composition on the inner surface of the tube, the composition comprising (1) a peroxide-curable acryl- or methacryl-modified epoxy resin, which is solid or semisolid at temperatures of about 0 to 30° C. but soften or liquefy at temperatures at which the tube is subject to heat-shrinkage, and (2) a peroxide sufficient to cure said resin at the heat-shrinkage temperature of the tube.

2. A heat-shrinkable tube as claimed in claim 1, wherein the compound layer is further comprised of a viscosity-controlling material and a reaction inhibitor.

3. A heat-shrinkable tube as claimed in claim 1, wherein the acryl- or methacryl-modified epoxy resin is a bisphenol type resin epoxy resin diacrylate or dimethacrylate.

4. A heat-shrinkable tube as claimed in claim 1, wherein the base layer is comprised of a fluorine-based polymer.

5. A heat-shrinkable tube as claimed in claim 4, wherein the fluorine-based polymer is a polyvinylidene fluoride and an ethylene tetrafluoride-propylene hexafluoride copolymer.

6. A heat-shrinkable tube as claimed in claim 1, wherein the base polymeric material is an acryl-modified epoxy resin and further wherein the peroxide is selected from group consisting of tert-butyl perbenzoate and dicumyl peroxide.

* * * * *